J. F. LAMB AND G. A. HUME.
COUPLING DEVICE.
APPLICATION FILED SEPT. 22, 1920.
1,435,482.
Patented Nov. 14, 1922.
2 SHEETS—SHEET 1.
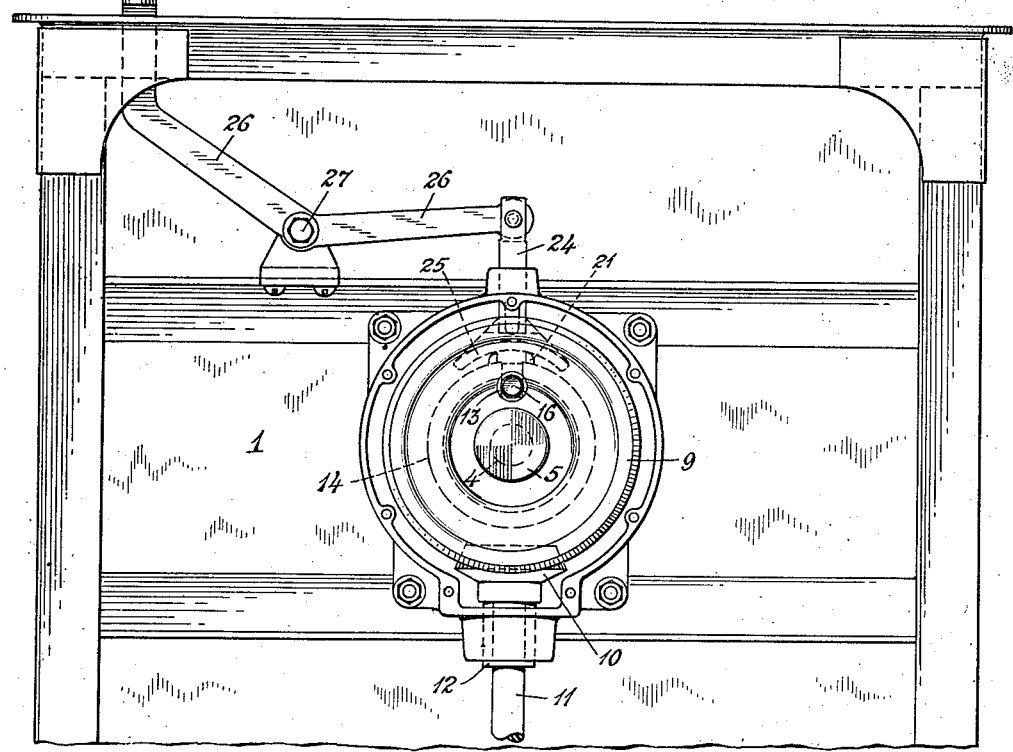
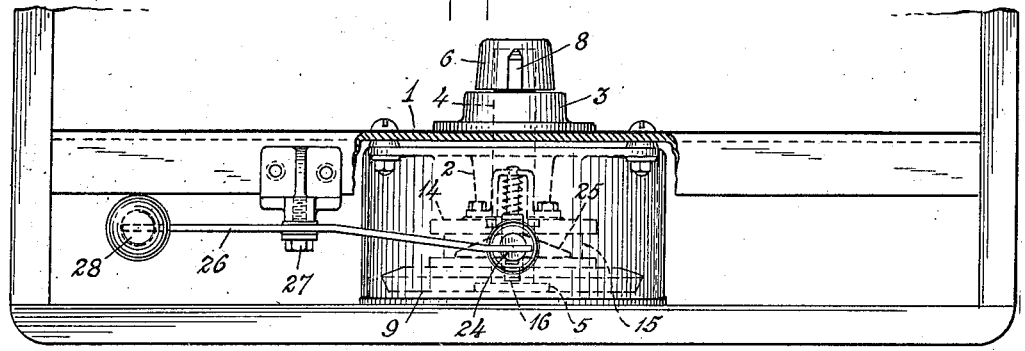
INVENTORS
J. F. LAMB
G. A. HUME
BY Bartlett Brownell
ATTORNEYS

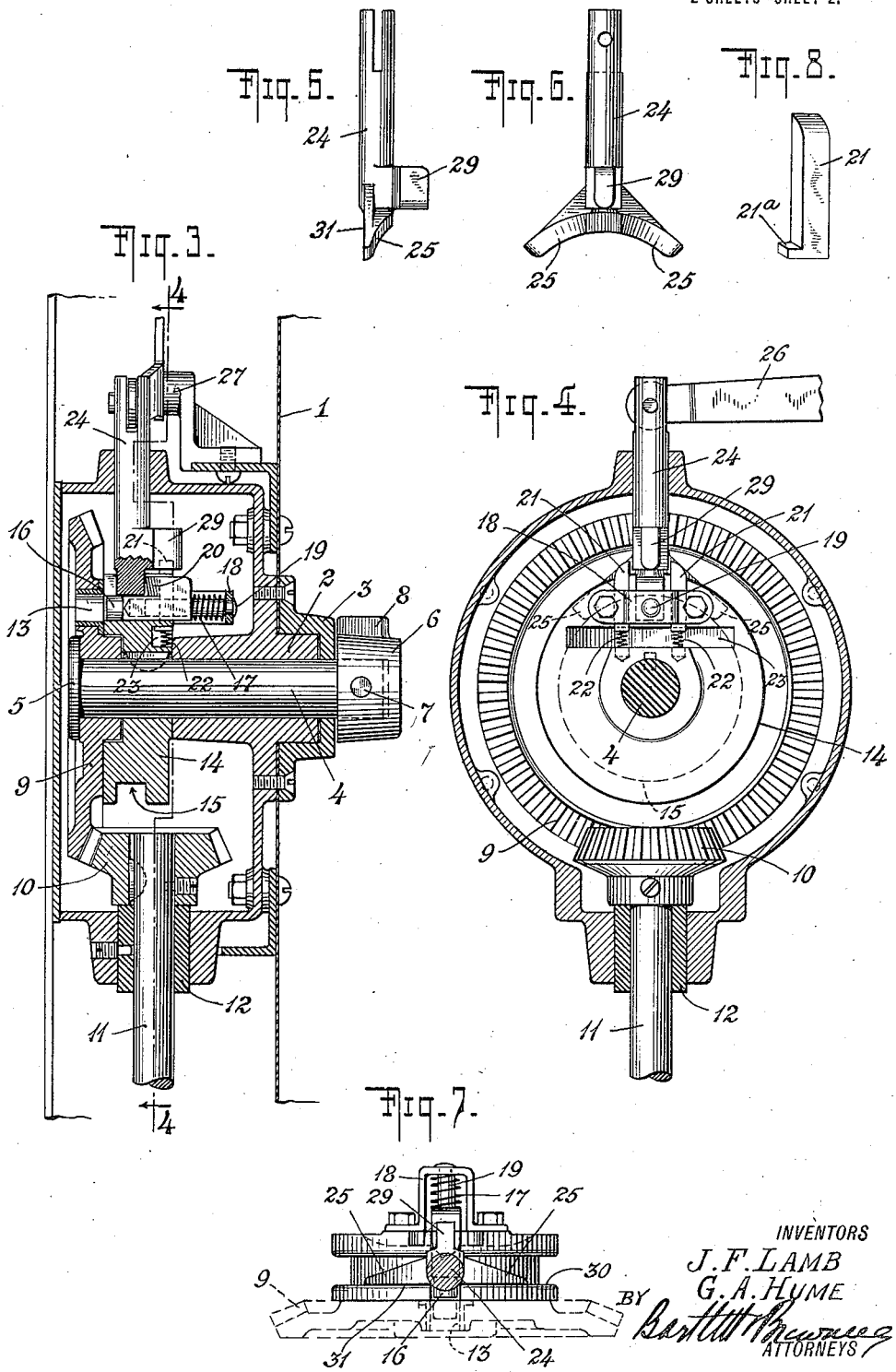

Patented Nov. 14, 1922.

1,435,482

UNITED STATES PATENT OFFICE.

JOSEPH F. LAMB AND GEORGE A. HUME, OF NEW BRITAIN, CONNECTICUT, ASSIGNORS TO LANDERS, FRARY & CLARK, OF NEW BRITAIN, CONNECTICUT, A CORPORATION OF CONNECTICUT.

COUPLING DEVICE.

Application filed September 22, 1920. Serial No. 411,994.

*To all whom it may concern:*

Be it known that we, JOSEPH F. LAMB and GEORGE A. HUME, citizens of the United States, residing at New Britain, county of Hartford, and State of Connecticut, have invented a certain new and useful Improvement in Coupling Devices, of which the following is a full, clear, and exact description.

Our invention relates to a new and improved coupling device and has for its object to provide a simple and efficient mechanism for connecting a rotatable shaft with a rotating element and for disconnecting the same while it is rotating in either direction and holding it in a predetermined position when so disconnected, the connection and disconnection being accomplished by a bolt carried by the driven member.

It further has for its object to provide a coupling and uncoupling device comprising a bolt and a controller therefor so that the bolt will be positively retracted by the revolution of the driven member in either direction to uncouple it from the driving member. It further has for its object to provide a controller which will act to retract the bolt and also act to stop the driven member and hold it from movement in either direction as soon as it is uncoupled.

Our invention is particularly applicable to washing machines for the purpose of coupling and uncoupling the cylindrical drum from the source of power when desired.

The following is a description of our invention, reference being had to the accompanying drawings, in which—

Fig. 1 shows a side elevation of the upper portion of a washing machine in which our coupling device is employed;

Fig. 2 is a plan view of the same, the parts being broken away;

Fig. 3 is a vertical section through the axis of the driven shaft;

Fig. 4 is a vertical section on the line 4—4 of Fig. 3;

Figs. 5 and 6 are an end and side elevation of a controlling member for retracting the bolt;

Fig. 7 is a detail view of a disc and means carried thereby for connecting it to a rotating member shown in dots;

Fig. 8 is an enlarged detail of a stop member.

Referring more particularly to the drawings, 1 is a side wall of a tub of a washing machine. 2 is a bearing secured thereto by screws and a capped plate 3. 4 is a shaft in said bearing having a head 5 integral therewith and a terminal piece 6 secured by a pin 7 and having a lateral projection 8 adapted to engage a corresponding recess in the head of the drum cylinder. Rotatably mounted upon the shaft 4 is a gear 9 driven by a beveled pinion 10, carried by a shaft 11, supported in a bushing 12. The shaft 11 is continuously driven by any suitable power such, for instance, as an electric motor. The gear 9 is provided with an eccentrically located opening 13. Splined to the shaft 4 so as to be juxtaposed to the gear 9 is a disc 14 having a peripheral groove 15. This disc is provided with a peripheral recess parallel with its axis and in which lies a bolt 16 which is pressed toward the gear 9 by a spring 17 bearing against a yoke 18 secured to the disc. The yoke 18 has a pin 19 which is surrounded by the spring 17 and enters a hole in the bolt 16 so as to guide and retain the same. The bolt 16 has a rounded projection 20 or abutment which when the bolt extends into the opening 13 projects into the groove 15. Upon each side of the bolt 16 are spring dogs 21, 21, normally held in elevated position by springs 22, as shown in Fig. 4. These dogs lie in parallel grooves formed in the rear face of the disc 14, their lower ends extending into a recess 23 of a greater depth than the parallel grooves in which the dogs lie. The dogs have lateral extensions 21ª which engage the uppermost surface of the recess 23 and act to limit the upward movements of the dogs 21, 21. The yoke 18 has feet which are secured to the disc 14 by bolts which feet partially cover the parallel grooves in which the dogs 21, 21, lie so as to retain the dogs in said grooves.

In order to control the bolt so as to retract it and withdraw its end from the opening 13 when desired without reference to the direction of movement, we provide the plunger 24 having oppositely slanting cam surfaces 25 which are engaged by the rounded surface 20 as the disc 14 revolves in one direction or the other so that the bolt 16 is retracted thereby. This plunger is moved into and out of operative position by a lever 26 fulcrumed at 27 and having a handle 28. The plunger 24 is provided with a lateral extension 29 which extends into the path of the ends of the dogs 21, 21, so that when those dogs approach the projection 29 the dog which is in advance engages the same and is forced inward thereby, passing under the projection 29 and thereafter rising to normal position. The other dog then advancing engages the projection 29 and is stopped thereby. The projection 29 then lies between the two dogs and holds the disc 14 with the shaft 4 against rotation in either direction and therefore holds the drum of the washing machine in a predetermined position. In this way, the drum can be stopped in a predetermined position and if the door is uppermost, the drum will always be stopped with the door uppermost and held in that position.

The operation of the device is as follows.

The wheel 9 is constantly revolved by the rotating shaft 11 and the beveled pinion 10 secured thereto. If the bolt 16 is within the recess 13, as shown in Fig. 2, which is the case whenever the plunger 24 is raised by the handle 28 and lever 26, the wheel 9 will cause the disc 14 and shaft 4 to revolve. If it is desired to stop the shaft 4, the handle 28, shown in Fig. 1, is moved to the right, which causes the head of the plunger 24 to enter the groove 15 so that the cam surfaces 25, 25, lie in the path of the rounded projection 20. The engagement of the rounded projection 20 with one of the surfaces 25 results in the retraction of the bolt 16 so as to withdraw it from the opening 13 and thus disconnect the disc 14 from the source of power. Near the end of the retraction of the clutch bolt 16 one of the dogs 21 strikes the projection 29, which depresses the dog to enable the dog to pass by the projection and the projection is then engaged by the other dog to stop the shaft in a predetermined angular position, the shaft being then held from movement in either direction by the projection being held between the dogs, the first mentioned dog having risen to its normal position after passing by the projection. These dogs 21 are necessary since otherwise the shaft 4 could be turned by turning the washing machine drum, thereupon the bolt 16 would be moved to a position where it would be no longer controlled by the plunger 24, and would be forced into the opening 13 when that opening in the continuously revolving gear 9 reached the position opposite the bolt.

When the parts 9 and 14 are not coupled together by the bolt 16 and it is desired to couple them together, the plunger 24 is lifted by a movement of the handle 28 toward the left to the position shown in Fig. 1 withdrawing the head of the plunger with the cam surfaces 25, 25, from the groove 15 and out of the path of the projection 20 permitting the bolt 16 to move into the recess 13 when that recess comes opposite the bolt. The side 30 of the groove engaging the flat side 31 of the head of the plunger provides a thrust bearing for the head of the plunger resisting the thrust due to the contact of the rounded surface 20 with one of the surfaces 25 which tends to turn the plunger about its axis.

By making the head 5 integral with the shaft 4 and securing the parts together by fastening the member 6 to the bolt, a very simple means for assembling the gear 9, disc 14 and shaft 4 in the bearing tube carried by the tub is secured.

As will be evident to those skilled in the art, our invention permits of various modifications without departing from the spirit thereof or the scope of the appended claims.

What we claim is:—

1. In a coupling device, the combination of a shaft, a wheel revolubly mounted thereon and provided with an eccentric opening, means for driving said wheel, a disc fixed to said shaft adjacent to said wheel, said disc having a passage, a bolt in said passage adapted to enter said opening in said wheel, a spring tending to move said bolt toward said wheel and into said opening, said bolt having an abutment facing said wheel, and a double faced cam adapted to be moved toward and from the axis of said disc and when in inward position engaging said abutment and retracting said bolt from said opening upon movement of said disc in either direction and means for moving said cam, and spring dogs on each side of said bolt, said cam member having a portion adapted to be engaged by said dogs and thereby force one of them inward and the other acting as a stop when said disc revolves in either direction.

2. In a coupling device, the combination of a shaft, a wheel revolubly mounted thereon and provided with an eccentric opening, means for driving said wheel, a disc fixed to said shaft adjacent to said wheel, said disc having a passage, a bolt in said passage adapted to enter said opening in said wheel, a spring tending to move said bolt toward said wheel and into said opening, said bolt having an abutment facing said wheel, and a double faced cam adapted to be moved toward and from the axis of said disc and when in inward position engaging said abutment and retracting said bolt from said opening upon movement of said disc in either direction and means for moving said cam, and spring dogs on each side of said bolt, said cam member having a portion adapted to be engaged by said dogs and thereby force one of them inward and the other acting as a stop when said disc revolves in either direction, a yoke for said spring having a projection surrounded by said spring and entering a recess in said bolt.

3. In a coupling device, the combination of a shaft, a wheel revolubly mounted thereon and provided with an eccentric opening, means for driving said wheel, a disc fixed to said shaft adjacent to said wheel, said disc having a passage parallel to its axis and having also parallel grooves, a bolt in said passage adapted to enter said opening in said wheel, a spring tending to move said bolt toward said wheel and into said opening, said bolt having an abutment facing said wheel, and a double faced cam adapted to be moved toward and from the axis of said disc and when in inward position engaging said abutment and retracting said bolt from said opening upon movement of said disc in either direction and means for moving said cam, and spring dogs on each side of said bolt and in said parallel grooves, said cam member having a portion adapted to be engaged by said dogs and thereby force one of them inward and the other acting as a stop when said disc revolves in either direction, a yoke for said spring having portions holding said dogs in place in their parallel grooves in said disc.

4. A coupling device having, in combination, rotatable driving and driven clutch members, manually operable means for connecting and disconnecting said clutch members, a stop member carried by said means out of and into a predetermined position upon actuation of said means to connect and disconnect said clutch members, respectively, and means cooperating with said stop member when the clutch members are disconnected to stop the driven member in a predetermined angular position and to lock the driven member from rotation in either direction comprising a pair of spaced stop dogs carried by the driven member arranged to engage opposite sides of said stop member as the clutch members are disconnected.

JOSEPH F. LAMB.
GEORGE A. HUME.